United States Patent Office

3,781,354
Patented Dec. 25, 1973

3,781,354
PROCESS FOR PURIFICATION OF
N-ACETYL-P-AMINOPHENOL
John Richard Kosak, Wilmington, Del., assignor to E. I.
du Pont de Nemours and Company, Wilmington, Del.
No Drawing. Continuation-in-part of abandoned application Ser. No. 88,179, Nov. 9, 1970. This application June 12, 1972, Ser. No. 261,811
Int. Cl. C07c 103/38
U.S. Cl. 260—562 B
2 Claims

ABSTRACT OF THE DISCLOSURE

Color exhibiting by-products produced in the acetylation of p-aminophenol to N-acetyl-p-aminophenol are removed from the N-acetyl-p-aminophenol by treating a hot aqueous solution of N-acetyl-p-aminophenol with ferric chloride to oxidize the by-product to the colored state and adsorbing the colored by-product on activated carbon. The activated carbon is then removed and the N-acetyl-p-aminophenol is recovered from the solution.

CROSS-REFERENCE TO RELATED APPLICATIONS

This application is a continuation-in-part of copending application Ser. No. 88,179, filed Nov. 9, 1970, now abandoned.

BACKGROUND OF THE INVENTION (1) Field of the invention

This invention relates to a process for removing color exhibiting by-products from crude N-acetyl - p - aminophenol prepared by the reaction of p-aminophenol with acetic acid or anhydride. The preparation of pure, white N-acetyl-p-amino-phenol has been the object of study for a number of years. N-acetyl-p-aminophenol is widely used in the pharmaceutical industry as an analgesic and antipyretic and consequently a highly pure product is much in demand.

(2) Prior art

N-acetyl-p-aminophenol has been customarily prepared by acetylation of p-aminophenol at atmospheric pressure and temperatures ranging from room temperature to 130° C., using acetic acid or acetic anhydride. Variations of this general procedure are shown in U.S. Pats. 3,113,150 and 3,042,719. An unsatisfactory product is generally obtained due to the readily oxidizable nature of p-aminophenol with consequent formation of colored by-products which are carried over to the acetylated product. As pointed out in U.S. Pat. 3,042,719 aminophenols oxidize readily to give quinone, quinonimine and meri-quinonimine impurities which impart discoloration to acetylated aminophenol. Various methods for the purification of N-acetyl-p-amnophenol have been suggested, such as the use of boron compounds (U.S. Pats. Nos. 2,945,870, 3,081,-321 and 3,081,322), reducing agents, e.g., sulfides and sulfites (U.S. Pat. No. 2,478,114), and alkaline treatments (U.S. Pat. No. 2,822,370), as well as the usual washing and recrystallization techniques. Such methods are either involved and costly or, more important, do not remove completely the colored by-products. Treatment with reducing agents, for instance, serves mainly to convert the colored compounds to a colorless form which reverts easily to the original colored form on oxidation with air.

In an effort to avoid the actual preparation of p-aminophenol, a preparative method has been suggested for the simultaneous reduction and acetylation of p-nitrophenol. Although the N-acetyl-p-aminophenol so obtained is of improved quality, it still requires some purification to meet the high standards of the pharmaceutical industry. This is illustrated in U.S. Pat. No. 3,341,587, where a reducing agent, sodium hydrosulfite, is used.

SUMMARY OF THE INVENTION

In summary, this invention is directed to a process for removing color exhibiting by-products which absorb light principally at about the 490 m$\mu$ wavelength, from N-acetyl-p-aminophenol prepared by acetylating p-aminophenol with acetic acid, acetic anhydride or their mixtures, said process comprising:

(a) contacting an aqueous solution of said N-acetyl-p-aminophenol, at from about 80° C. to about 100° C., with from about 0.25 to about 1.0% of ferric chloride, and from about 0.5 to about 5% of activated carbon, both based on the weight of said N-acetyl-p-aminophenol, whereby said by-products in said N-acetyl-p-aminophenol are oxidized to the colored state and the oxidized by-products are adsorbed on said carbon;

(b) separating said carbon from the aqueous solution; and (c) recovering the N-acetyl-p-aminophenol from said aqueous solution.

DESCRIPTION OF THE INVENTION

As pointed out above, the process of this invention is directed to removal of color exhibiting by-products produced in acetylation of p-aminophenol. The acetylation is carried out with acetic acid, acetic anhydride or mixtures of these two in a suitable vessel and under a wide range of reaction conditions. The temperature range is not critical, but the slightly exothermic reaction is generally run at a temperature ranging from room temperature up to about 130° C. The reaction is most economically run at atmospheric pressure although higher pressure can be used if desirable. The product of this reaction is referred to hereinafter as crude N-acetyl-p-aminophenol or merely as "crude."

It has now been found that pure white N-acetyl-p-aminophenol is obtained by a simple, economical treatment of an aqueous solution of the crude product with ferric chloride and activated carbon. The colored, usually pink, impurities are actually removed, not reduced to a colorless form. Normally when the crude containing the impurities is dissolved in water, the water becomes pink, but on crystallization, the pink color stays with the N-acetyl-p-aminophenol and the water becomes essentially colorless. However, when the ferric chloride treated product is dissolved in water and the solution boiled, there is no regeneration of pink color and the water remains essentially colorless.

The process of the invention comprises dissolving crude N-acetyl-p-aminophenol prepared by acetylating p-aminophenol with acetic acid, acetic anhydride or their mixtures, and containing by-product impurities, generally of pink coloration, in hot water (from about 80° to about 100° C., preferably from about 90° to about 100° C.) and adding about 0.25 to 2%, preferably 0.5 to 1.0%, based on the weight of crude, of ferric chloride. The solution is maintained at this temperature for about 15 minutes to 2 hours, depending on the amount of impurities. To this hot solution, 0.5 to 5%, based on the weight of crude, of activated carbon is added, preferably 1 to 3%, and the mixture is maintained at from about 80° to about 100° C. for about 15 to 30 minutes and filtered to remove the carbon. As the solution is cooled to room temperature, pure white N-acetyl-p-aminophenol crystallizes and is recovered by any suitable means, preferably by filtration. The N-acetyl-p-aminophenol is now free of color-forming by-product impurities. In some instances it may be desired to remove excess iron salts which were not completely adsorbed by the first carbon treatment. In such instances, the product is redissolved in water, about 0.5 to 5% by weight of carbon is added to the solution and the N-acetyl-p-aminophenol is recrystallized to remove any excess iron salts which may have been carried over with the first crystallization.

Any carbon having adsorbing properties can be used such as animal or vegetable carbon. Representative of suitable adsorptive carbons are those known as "Darco," "Norit," "Nuchar," "Carbolac," and the lampblacks. Although carbon has been used frequently to decolorize various materials including N-acetyl-o-aminophenols (see U.S. Pat. 3,076,030) its use in this process is solely to adsorb the impurities after they have been treated with ferric chloride.

Treatment of the hot aqueous solution of N-acetyl-p-aminophenol with carbon without the ferric chloride pretreatment will not remove the impurities. Ferric chloride has been found to be unique in its ability to oxidize and separate color exhibiting by-products from N-acetyl-p-aminophenol. The carbon merely serves to remove the treated contaminants and iron salts from solution.

EXAMPLE 1

Four hundred milliliters of distilled water, 105 grams of sodium p-nitrophenate and 1.0 gram of nickel based hydrogenation catalyst were charged to an autoclave. The autoclave was placed in a shaker and heated at 100–105° C. for 2 hours and 13 minutes under applied hydrogen pressure of 100 pounds per square inch. The pressure was then released, the charge was cooled to 85° C., and the contents added to an acetylation flask containing 2 grams of sodium bisulfite. To the agitated mixture in the flask were then added 65 milliliters of acetic anhydride over 1 hour, and then 1 gram of "Norite" decolorizing charcoal and 0.5 gram of additional sodium bisulfite. The charge was heated to reflux (104° C.) for ½ hour, and was then filtered through filter cloth on a steam heated filter. The filtrate was allowed to cool slowly overnight. The next day the mixture was cooled to 10° C., and the product crystals were removed by filtration and washed well with distilled water. This crude product had an objectionable light pink color. The crystals were redissolved in 400 milliliters distilled water and 1 gram of decolorizing charcoal by heating and again filtered, cooled and isolated by filtration. The product was dried in air at 35–40° C. The product crystals still had an objectionable light pink color.

Ten grams of the crude N-acetyl-p-aminophenol having a pink coloration were added to 75 milliliters of water. To this mixture 0.1 gram of ferric chloride was added and the mixture heated to the boiling point and refluxed for 1.5 hours. Then 0.5 gram "Darco" G–60 charcoal was added and the mass refluxed for 15 minutes longer. The hot mixture was filtered and the filtrate cooled. Nine and five-tenths grams of white crystalline N-acetyl-p-aminophenol formed on cooling, and were collected by filtration and dried.

The product so obtained was redissolved in water and boiled. No pink color was observed.

Examples 2, 3 and 4 further illustrate the effectiveness of treatment of the crude N-acetyl-p-aminophenol with ferric chloride and carbon in comparison with carbon alone.

EXAMPLE 2

Ten grams of the crude N-acetyl-p-aminophenol of Example 1 was dissolved in 75 milliliters of distilled water and heated for one hour at 80°–90° C. The water level was maintained at 75 milliliters as 0.5 gram of "Norite" A charcoal was added and the mass was then held at 85°–90° C. for 15 minutes. The mixture was filtered and the filtrate allowed to cool to room temperature whereupon the N-acetyl-p-aminophenol precipitated. The product was collected by filtration, washed with 20 milliliters of distilled water and air dried. The color of the N-acetyl-p-aminophenol was light pink.

EXAMPLE 3

The procedures of Example 2 were repeated with the difference that 0.1 gram of ferric chloride was added during the initial mixing of N-acetyl-p-aminophenol with water. The color of the isolated N-acetyl-p-aminophenol after drying was white.

EXAMPLE 4

Samples of 1.0 gram of the products obtained by Examples 2 and 3 were each dissolved in 10 milliliters of ethanol and examined at a wavelength of 490 m$\mu$ (the absorption wavelength of the pink impurity) on a Bausch and Lomb Spectronic 20 Colorimeter. The sample from Example 2 had a light transmittance of 79.4%, while the sample from Example 3 had a 100% light transmittance.

The embodiments of the invention in which an exclusive property or privilege is claimed are defined as follows:

1. A process for removing color exhibiting by-products which adsorb light principally at about 490 m$\mu$ wavelength, from N-acetyl-p-aminophenol prepared by acetylating p-aminophenol with acetic acid, acetic anhydride or their mixtures, said process comprising:
   (a) contacting an aqueous solution of said N-acetyl-p-aminophenol, at from about 80° C. to about 100° C., with from about 0.25 to about 2.0% of ferric chloride and from about 0.5 to about 5.0% of activated carbon, both based on the weight of said N-acetyl-p-aminophenol, whereby said byproducts in said N-acetyl-p-aminophenol are oxidized to the colored state and the oxidized by-products are adsorbed on said carbon;
   (b) separating said carbon from the aqueous solution; and
   (c) recovering the N-acetyl-p-aminophenol from said aqueous solution.

2. The process of claim 1 in which the product of Step (c) is redissolved in hot water, the solution is contacted with from about 0.5 to about 5% by weight of activated carbon to adsorb excess iron salts, the carbon is separated from the solution and N-acetyl-p-aminophenol is recovered from the solution.

References Cited

UNITED STATES PATENTS 3,076,030    1/1963    Freifelder _____ 260—562

HARRY I. MOATZ, Primary Examiner